United States Patent
Hussain et al.

(10) Patent No.: US 8,487,147 B2
(45) Date of Patent: Jul. 16, 2013

(54) NANO-CATALYST FOR FAST TRACK BIO-DIESEL PRODUCTION FROM NON-EDIBLE OILS

(76) Inventors: Syed Tajammul Hussain, Islamabad (PK); M. Bilal Khan, Islamabad (PK)

( * ) Notice: Subject to any disclaimer, the term of this patent is extended or adjusted under 35 U.S.C. 154(b) by 750 days.

(21) Appl. No.: 12/714,730

(22) Filed: Mar. 1, 2010

(65) Prior Publication Data

US 2011/0209389 A1 Sep. 1, 2011

(51) Int. Cl.
*C07C 1/00* (2006.01)
(52) U.S. Cl.
USPC .......................................... 585/240; 585/242
(58) Field of Classification Search
CPC ........... Y02E 50/10; Y02E 50/13; Y02E 50/18; Y02E 50/20
USPC .................... 585/240, 242; 44/605; 562/891
See application file for complete search history.

(56) References Cited

U.S. PATENT DOCUMENTS

| 3,466,320 | A | * | 9/1969 | Hargis | 560/215 |
|---|---|---|---|---|---|
| 4,161,606 | A | * | 7/1979 | Yankee | 560/53 |
| 5,354,878 | A | * | 10/1994 | Connemann et al. | 554/167 |
| 7,429,281 | B2 | * | 9/2008 | Wu | 44/308 |
| 7,790,937 | B2 | * | 9/2010 | Henkelmann et al. | 568/861 |
| 8,088,183 | B2 | * | 1/2012 | Jackam et al. | 44/308 |
| 8,119,832 | B2 | * | 2/2012 | Parnas et al. | 560/217 |
| 2005/0204612 | A1 | * | 9/2005 | Connemann et al. | 44/437 |

* cited by examiner

*Primary Examiner* — Nina Bhat
(74) *Attorney, Agent, or Firm* — Sarfaraz K. Niazi

(57) ABSTRACT

Doped nanomaterials are used for the conversion of non-edible oils into biodiesels.

25 Claims, No Drawings

NANO-CATALYST FOR FAST TRACK BIO-DIESEL PRODUCTION FROM NON-EDIBLE OILS

FIELD OF INVENTION

The instant invention relates to a nano-catalyst, which produces surprisingly improved bio-diesel fuels, blends of petroleum based diesel fuel and fuels derived from biological resources, with substantially reduced particulate matter emission characteristics and at an extremely low cost.

BACKGROUND

Diesel fuel is a refined petroleum product that is burned in the engines powering most of the world's trains, ships, automobiles and trucks. Petroleum is of course, a non renewable resource of finite supply. Acute shortage and dramatic price increases in petroleum and refined products derived from petroleum have caused great burden on consumers during the past quarter century. Further, diesel engines emits relatively high level of pollutants, especially particulates such as inter alia soot, adsorbed hydrocarbons and sulfates, which are usually formed due to incomplete combustion of fuel and is responsible for serious health hazards. The others most common pollutants in diesel exhausts are nitric oxides and nitrogen oxides, hydrocarbon and sulfur dioxide, and to a lesser extent, carbon monoxide. Accordingly, extensive research effort is now being directed towards replacing some or all petroleum based diesel fuel with a cleaner-burning fuel derived from sustainable sources such as non-edible oils.

The vegetables oils have comparable energy, density, cetane number, heat of vaporization, and stoichiometric air/fuel ratio with mineral diesel. In addition, they are biodegradable, non-toxic, and induced significantly less pollution. The use of vegetable oils and their derivatives in diesel engines leads to substantial reductions in emission of sulfur oxides, carbon monoxide, poly-aromatic hydrocarbons, smoke, particulate matters and noise. Furthermore, the contribution of bio-fuels to green house effect is insignificant. The vegetable oil is often directly added to diesel fuel to operate compression ignition engines and is an attempt to replace at least a portion of the diesel fuel. These vegetable/non-vegetable oils are composed mainly of triglycerides, and often contain small amounts (typically between 1 to 10% by weight) of free fatty acids. But due to worldwide shortage of edible food products, their use to supplement diesel fuel is discouraged. The researchers now focus on the use of non-edible oil, like Jatropha and rapeseed oil.

Jatropha is non-edible oil being singled out for large-scale plantation. This plant can thrive under adverse conditions. It is drought-resistant, perennial plant, living up to fifty years and has the capability to grow on marginal soils. It requires very little irrigation and grows in all type of soils. The production of Jatropha seeds is about 0.8 kg per square meter per year. The oil content of Jatropha seed ranges from 30 to 40% by weight and the kernel itself ranges from 45% to 60%. The fatty acids composition of Jatropha is mainly of linoleic or oleic acid type, which are unsaturated fatty acids. The fatty acid composition of Jatropha oil consists of myristic, palmitic, stearic, arachidic, oleic and linoleic acids. The oil compares well against other vegetable oils and more importantly to diesel in terms of its fuel rating per kilogram or hectare of oil produced.

Consequently there remains a need for an improved fuel derived from non-edible oil sources that can be used either alone as blended with petroleum-based diesel fuel.

It is therefore an objective of the instant invention to provide an alternative fuel source that does not contains fatty acids methyl esters.

It is a further objective of the instant invention to provide an alternate fuel source that can be used on existing engines without needing to modify or retune the engines.

It is still further objective of the instant invention to provide a fuel additive that, when combined with diesel fuel, does not adversely affect the engine in the long-term use.

It is yet another objective of the instant invention to provide a bio-fuel with additive that, when used in the system will not generate $NO_{xs}$ and $SO_{xs}$, and consequently it will provide a cleaner source of alternate fuel.

It is still another objective of the instant invention to provide a fuel free from soap and other by-products.

It is still further objective of the instant invention to provide a process that does not require any outside energy to accomplish the production of bio-fuel.

It is yet still further objective of the instant invention to provide a material, which when it is part of the fuel, will reduce carbon emissions, thus eliminating the need of adding smoke or emissions suppressants.

Diesel fuels are known to contain a synergistic cetane improving additive combination of peroxidic component and an aliphatic polyether of the formula R(—O—X)n O—R@1 where R and R@1 are alkyl groups, X is an alkylene group and n is an integer (U.S. Pat. No. 2,655,440 and divisional U.S. Pat. No. 2,763,537.

European Application 80-100827.7 describes the use of various propylene glycol mono-an-di-ethers as a component of diesel fuels. The composition mono-an-di-ethers is also sued as a component of diesel fuel. The compositions described in this reference involve a multi-component formulation, which includes poly-ethers, acetals, lower alkanols, water and only up to 85 volume % diesel fuel hydrocarbon.

The UK Patent 1246853 describes the addition of dialkyl ethers of propylene glycol as smoke suppressants in diesel fuel.

The U.S. Pat. No. 4,753,661 describes a fuel such as diesel fuel containing a conditioner, which comprises a polar oxygenated hydrocarbon, a compatibilizing agent, which is an alcohol, aromatics, and a hydrophilic separant which may be a glycol monoether.

The Japanese patent 59-232176 describes the use of di-ethers of various polyoxyalkylene compounds as diesel fuel additives.

The addition of glycol ethers and metallic smoke suppressants has been found to reduce the smoke and soot emissions. These suppressants have been found to reduce smoke and soot emissions. These metallic smoke suppressants are typically metal salts of alkanoic acids (U.S. Pat. Nos. 3,594,138, 3,594,140, 3,615,292 and 3,577,228). The health and environmental risks of barium are major concerns in these instances.

The European Application 82-109-2665 describes the use of ethers to reduce soot. However, a number of these ethers are unable to be used commercially in the US because the resulting fuel does not meet the flash point specification of 126° F. This application also teaches that glycol ethers are not highly effective at reducing exhaust emissions. The Japanese Patent Application 59-232176 teaches that glycol ethers of the formula $R_1$—O—$(CHR_2$—$CH_2$—O—$)_n R_3$, where n is less than five have the effect of reducing particulates. The CO and HC emissions are reduced.

Winsor and Bennethum (SAE 912325) describe the use of ether diglyme to reduce particulate emissions. In addition to being costly to produce, diglyme is highly toxic and has been associated with increased rates of miscarriages. Glycol ethers based on the higher alkylene oxides, especially propylene and butylenes, are far less toxic than those based on ethylene oxide. Glycol ethers based on ethylene oxide also have unfavorable water partition coefficients. The water partition coefficient for diglyme is greater than 17 eliminating this as a choice for commercial use as a diesel fuel additive.

The addition of dialkyl carbonates and dialkyl dicarbonates, particularly dimethyl carbonates to diesel fuel has been described to reduce exhaust emissions from compression ignition engines (U.S. Pat. Nos. 32,311,386, 4,891,049, 5,004,480, and 4,904,279). The high volatility of the lower alkyl carbonates prevents their addition in substantial amounts to typical D-2 diesel fuel. While some dicarbonates have lower volatilities, their poor hydrolytic stability precludes their commercial use.

Environmental regulations worldwide have established certain emission standards for diesel engines, particularly with regard to nitrogen oxide and particulate matter emissions. The contribution of diesel fuel sulfur content to exhaust particulates has been well established, and has led to an EPA regulation requiring highway diesel fuels to contain no more than 0.05 wt % sulfur and the particulate matter emissions to drop from 0.60 to 0.25 grams/BHP-hr. Similarly, allowed nitrogen oxide has been decreased from 6.0 to 4.0 grams/BHP-hr.

Many strategies are used by the industry to reduce exhaust emissions. Improved heavy diesel engines designs including higher injection pressures, turbo-charging, air inter-cooling, retarded injection timing through electronic tuning control, exhaust gas recycle and exhaust after treatment devices are some examples of the attempts to lower environment emissions. However, for these advanced technologies to work, a high quality, low emissions diesel fuel is required in addition to the use of various fuel additive improvements such as cetane and diesel fuel detergents to keep fuel injectors clean and improve the performance of low ash engines oils. A combination of these strategies will have to be utilized to meet newer clean air standards worldwide. The key focus is to find the most effective combination of technologies which offer the best cost/performance.

The instant invention overcomes all of the diesel fuel problems by introducing a state of the art nano material which, when incorporated in the diesel fuel considerably reduces the formation of sulfur and nitrous compounds as well as hydrocarbons, carbon monoxides and unregulated aldehydes emissions.

Simple and polymeric esters are major products of the chemical industry. There are a wide variety of processes available for their production including direct esterification by reactions of alcohols with carboxylic acids or anhydrides as well as various interchange reactions including alcoholysis, in which the alcohol moiety of an ester is exchanged by another alcohol, acidolysis, and transesterification in which the alcohol moieties of two different esters exchange with each other. In the absence of a catalyst, esterification and transesterification reactions tend to be quite slow and result in the formation of byproducts, which require additional steps for their conversion. For this reason, reactions are almost always catalyzed. Acids, bases, and transition metal based catalysts are widely used in various applications. However, there are a number of problems associated with the use of acidic and basic catalysts. These catalysts often promote undesirable side reactions which can make it difficult to isolate a pure product without employing extensive purification procedures. Furthermore, they also often require neutralization at the end of the reaction as well as removal from the product. This again requires addition of extensive purification process or the use of another process step. The whole process then becomes economically unfeasible for commercialization.

To avoid many of the problems associated with acidic or basic catalysts, two types of catalysts are used (i) heterogeneous (ii) homogeneous. Homogeneous catalysts are soluble in reaction medium and for this reason they suffer from one of the major problems associated with many acidic and basic catalysts, i.e., the removal of the catalyst at the end of the reaction, which turns out difficult, if not impossible. Often even trace amounts of metal impurities in products are intolerable and, therefore, complex steps are needed to reduce metal contents to acceptable levels. This results in additional processing steps, waste, and/or yield losses. Further more, homogeneous catalysts are often destroyed during removal. This "once-through" utilization of the catalyst can result in unacceptable high manufacturing cost.

Heterogeneous catalysts are relatively insoluble in reaction medium. As a result, they avoid many of the purification problems associated with acidic, basic, and homogeneous catalysts. Often they can be removed from the product by a simple filtration step. However, since their activity occurs at the catalyst surface, rather than in solution, heterogeneous catalysts tend to have low activity. Thus the goal of catalyst research is to discover heterogeneous catalysts, which are not only selective and easily removed from the reaction mixture, and also become part of the fuel and thus contribute towards the enhancement of its properties.

The U.S. Pat. No. 4,043,941 and No. 4,032,550 describe the preparation of heterogeneous transesterification catalysts with high activity and good stability of these free-flowing powders. Although the catalyst described in above patents would be considered generally of high activity, they do not contribute in the reduction of particulates and other emissions. Hence a need still exists for highly active heterogeneous transesterifation catalysts that will have shorter reaction time and reduced emissions.

In summary, there are multiple operating options available for making biodiesels. Many of these technologies can be combined under various conditions and feed stocks in a large number of ways. The choice of technology is a function of desired capacity, feedstock type and quality, alcohol recovery, and catalyst recovery. The dominant factor in bio-diesel production is the feed stock cost, with capital cost contributing only about 7% of the final product cost.

It should be further apparent that even in view of known prior art, there remains a need for a procedure and a material which enables the use of crude glycerol, (produced as a byproduct of a biodiesel fuel producing esterification of renewable triglycerides procedure), yielding biodiesels as close in physical property to petroleum-based diesel product in its pour point, viscosity and cloud point temperature, at a very low cost.

There are three non-ester side streams that must be treated as a part of the overall biodiesel process. These are:
1. The excess alcohol that is recycled within the process.
2. The glycerol by product, and;
3. The waste stream from the process.

These extra steps in the production of biodiesel increase the cost and the length of the process. To minimize these processes, control the cost and to make it more environment-friendly, the instant invention reports a transesterification nano titanium dioxide anatase form of catalyst with high activity, less reaction time and emissions and significantly reduced particulates in the environment.

The use of heterogeneous nano-catalysts is in general new to this field of research. However, it does not seem possible in any industrial process to obtain both the ester and glycerin economically. The use of nano-catalyst of the instant invention makes it possible that no glycerin is formed and the conversion is around 90-95%.

Among the prior art that deals with heterogeneous catalysts, it is possible to cite European Patent EP-B-0 198243 where the transesterification catalyst, which transforms oil and methanol into methyl ester, is an alumina or mixture of alumina and ferrous oxide. In this art, the column that is used for the fixed bed has a volume of 10 liters, and oil is generally injected at a flow rate of less than 1 L/hr, which gives a VVH (volume of injected oil/volume of catalyst/hour) of less than 0.1. For a factory of 100,000 t/year this would correspond to reactors of at least 150 m³. Another problem that arises in this invention is that a substantial amount of glycerin is produced and the purity of ester formed ranges between 93.5% and 98%. What becomes of the glycerin that is not recovered is not indicated. In some cases, it forms glycerin ethers, such as the one that is indicated in this patent; in other cases, it may breakdown, unless it is eliminated in a first stage. The performance evidence provided in this art is low. It is possible to point out that with VVH indicated and contact times of more than 6-hours, conversions of 80% and more can be obtained even without a catalyst. This European patent therefore does not appear to offer a reasonable solution form an economic standpoint.

The UK patent GB-A-795573 describes using zinc silicate as a catalyst at temperature of between 250-280° C. and under a pressure of at least 100 bar, with methanol. It appears that there was 85% conversion in a first stage and 100% if glycerin was decanted in an intermediate step and the reaction was continued.

According to patent EP-B-0-193243, which cites GB-A 795573, zinc soaps would be formed with zinc compounds, which naturally cannot be allowed in the fuel. This is mainly due, it seems, to the high temperature that it is necessary to use in this reaction with this catalyst. In the first stage of the process that is described in this patent, or in the second stage if there are two transesterification stages, the glycerin is diluted, and the ester is washed. In this process, the drawbacks include the requirement of high pressure (more than 100 bar), high temperature (250-280° C.), washing the phases with water and necessary purification of the glycerin is needed to recycle the methanol, to distill it and not evaporate it.

In addition, the U.S. Pat. No. 4,668,439 is known, which describes a continuous production process in which operations are carried out at atmospheric pressure and where the ester and glycerin are evaporated by running excess through oil at more than 210° C., most often 240° C.; in the presence of soluble catalyst, which can be zinc laurate. The only example of zinc compound that is given in this document is, for that matter, the laurate salt; otherwise, the compounds are alkalis and various soaps. All of these examples use soluble catalysts. Glycerin represents only 70% of the theoretical value, which means that there are either losses or decomposition. In this process, the ester and the glycerin are evaporated by the passage of alcohol, which also raises the possibility of only the ester being evaporated and not the monoglycerides, whose boiling point is within a close range. From the energy standpoint in particular, the effectiveness of this process is questionable.

There are other references in the literature that teach use of zinc oxide, but in esterification reactions of glycerin with fatty acids [12]. In the instant invention, it was discovered that there is virtually no difference between zinc chloride, zinc sulfate, zinc powder, barium oxide, potassium bicarbonate, sodium methylate or sodium ethylate, and even lithium hydroxide in terms of their effectiveness. All these salts or oxides that provided yields of between 32 and 39% of monoglyceride in a comparative test when excess glycerin is used.

There are reports that demonstrated that instead of having neutral oil at the start, there is possibility of using acidic oils. This is therefore a first stage whose purpose is to eliminate the acidity of the oil. This reaction is fairly easy because it involves only small percent of the main reaction. In this connection, the zinc aluminate is not considered preferred over zinc in the list of the catalysts if it is desired to avid saponification and/or the formation of zinc salts. Esterification is an easier reaction than transesterification because there is elimination of a reagent; this does not take place in high-temperature transesterification, where as glycerin remains present and soluble.

Finally the prior art does not provide information on a reaction that can be employed economically on an industrial scale for production of bio-diesel.

No patent describes the use of S-doped $TiO_2$ nano-catalyst for the production of bio-diesel and that without producing any side product. This is a breakthrough invention reported here which can be scaled up quite easily and that does not produce any byproducts and demonstrates a very high rate of conversion. In the instant invention, the catalyst becomes the part of the fuel, interestingly reducing $NO_{xs}$ and SOxs formation without changing the over all properties of the produced biodiesel.

DETAILED DESCRIPTION OF THE INVENTION

There are two fundamental approaches to fabricate nanomaterials. The "bottom-up" approach represents the concept of constructing a nanomaterial from basic building blocks, such as atoms or molecules. This approach illustrates the possibility of creating exact materials that are designed to have exactly the desired properties. The second approach, the "top-down" method, involves restructuring a bulk material in order to create a nanomaterial [1]. Top-down method is usually not very well suited to prepare informally shaped particle; very small sizes are especially difficult to realize. Bottom-up procedures are much better suited to generate uniform particles, often of distinct size, shape, and structure.

Preparation of nanomaterials can be classified into physical and chemical methods. The physical methods are based on subdivision of bulk metals, including mechanical crushing or pulverization of bulk metal, arc discharge between metal electrodes, etc. Metal nanoparticles thus produced are usually large in size and have wide size distribution. The chemical methods are based on the reduction of metal ions or decomposition of precursors to form atoms, followed by aggregation of the atoms. Nanoparticles prepared by chemical methods usually have a narrow size distribution [2].

Anatase and rutile are commonly synthesized by an industrial way. Industrial production makes use of the ilmenite mineral through the sulfate and chloride methods. The sulfate process starts with dissolving the ilmenite material in sulfuric acid to produce titanium oxysulfate ($TiOSO_4$). This is followed by neutralization with a base to yield hydrated titanium oxide. Finally, calcination produces the anatase or rutile product. The hydrated oxide ($TiO_2:nH_2O$) and the product after calcination usually have low or no photocatalytic activity due to the presence of crystal defects and contaminants [3]. The chloride method is quite similar to the sulfate route, but instead of sulfuric acid, chlorine gas at high temperature (1000-1300 K) is used. The product of this reaction, titanium tetrachloride (TiCl$_4$) is subjected to thermal decomposition to produce anatase or rutile [4].

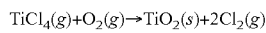

$$TiCl_4(g) + O_2(g) \rightarrow TiO_2(s) + 2Cl_2(g)$$

A large number of methods are emerging as synthetic routes for the preparation and doping of titania. These include: mechano-chemical synthesis, sol-gel process, hydrothermal process, Chemical vapor condensation, laser pyrolysis, precipitation. Comparatively, each method has advantages and disadvantages. In mechano-chemical synthesis powder is loaded together with several heavy balls in a container. By vigorously shaking or high-speed rotation, a high mechanical energy is applied on the powders because of collision with heavy balls. The mechanical milling will promote the diffusion of particles. High energy requirements, extensive long period of milling time, powder contamination due to steel balls are limitations of this method [5].

In chemical vapor condensation, during the short residence time of the precursor in the heated tube, the precursor molecules start to decompose. This gas stream then expands rapidly to mitigate particle growth. Finally, the nanoparticles condense out on a cooled substrate; they are scraped off and collected. Low production rates, problems in controlling the particle size and particle size distribution are limitations of this method [6]. Laser pyrolysis is based on the resonant interaction between laser photons and at least one gaseous species, reactants or sensitizer. A sensitizer is an energy transfer agent that is excited by the absorption of the CO$_2$ laser radiation and transfers, by collision, the absorbed energy towards the reactants. Low production rate, high energy consumption are limitations of this method [7]. Sol-gel process is based on inorganic polymerization reactions. It includes four steps: hydrolysis, polycondensation, drying and thermal decomposition. This process is a low temperature method, but it incorporates a series of successive steps and costly chemicals and does not easily allow for control of composition [8].

In microemulsion method, water/oil microemulsion solutions are nanosized water droplets dispersed in the continuous oil phase and stabilized by surfactant molecules. These surfactant-covered water pools offer a unique microenvironment for the formation of nanoparticles [9].

Precipitation method involves precipitation of hydroxide by the addition of a basic solution [NaOH, NH$_4$OH, Urea] to a raw material followed by calcination to crystallize the oxide. In this particular research activity precipitation method has been utilized to produce sulfur doped titanium dioxide nanoparticles. It is the simplest method in which a particular sequence of the reactants is maintained and products are achieved without tedious experimental details. The advantages of this method are: It works at room temperature and produces highly active catalyst. It also minimizes the migration of impurities on the surface because reaction proceeds at room temperature [10].

Hydrothermal method is a process that utilizes single or heterogeneous phase reactions in aqueous media at elevated temperature (T>25° C.) and pressure (P>100 kPa) to crystallize materials directly from solution. However, researchers also use this term to describe processes conducted at ambient conditions. Syntheses are usually conducted at autogeneous pressure, which corresponds to the saturated vapor pressure of the solution at the specified temperature and composition of the hydrothermal solution. In this particular research activity hydrothermal method has been utilized to produce copper doped titanium dioxide nanoparticles. This method is more environmentally benign than many other methods, which can be attributed in part to energy conserving low processing temperatures, absence of milling, ability to recycle waste, safe and convenient disposal of waste that cannot be recycled. The low reaction temperatures also avoid other problems encountered with high temperature processes, for example poor stoichiometry control due to volatilization of components [11].

In this invention, the titanium dioxide anatase form of nano particles is prepared as follows:

Sulfur-doped titanium dioxide was synthesized by precipitation method from TiCl$_4$. 15 ml of TiCl$_4$ were added into 100 ml of 15% H$_2$SO$_4$ solution in a beaker. A light yellow colored solution was obtained with pH of −0.75. The solution was stirred for two hours at room temperature. The NaOH solution (3M) was added drop-wise (the flow of NaOH solution was controlled through HPLC pump) in the resulting solution with continuous monitoring of pH. When the pH reaches to −0.11, the light yellow coloration disappeared and transparent solution was formed. The drop-wise addition of NaOH was continued until the pH of the resulting solution becomes 0.85. At this pH white precipitate was obtained. The pH of the white precipitate was further increased to 4 by the addition of NaOH. At this pH the reaction was stopped. It was then washed with distilled water. Dried overnight at 110° C. The powder thus obtained was grinded by pestle mortar and calcined at 500° C. for 6 hours.

Although the mechanism of improved catalyst properties, which this invention provides is not fully understood, we believe that when S and TiO$_2$ nano particles react with the oil, multiple points of attachments results. This produces a monolayer and every S—TiO$_2$ nano particles is takes part in the redaction because of the electronically modified catalyst. From the literature it is inferred that the role of sulfur is to provide an extra electron, which generates a site in which all the sulfur and nitrogen containing emissions are converted into nitrogen, sulfur and oxygen. It acts just like catalytic desulphurization of diesel fuel. The monolayer of catalyst would be expected to results in more active sites and because of its nano particles, large surface area is available for the reaction and that is the reasons that reaction just completes within five minutes, at room temperature and at atmospheric pressure.

The results reported in Table 1 support this argument, where very high dispersion of active catalyst particles is achieved using CO-chemisorption. The theory of the invention presented here is as a possible explanations for the surprising results obtained and in no way is intended to limit the scope of this invention. The nano-catalyst of this invention can be used to produce esters in continuous or in batch reactors. In general, the catalysts are effective in transesterification reaction between (C$_1$-C$_{30}$). Molar ratios of esters to alcohol can vary from 0.01 to 100. Reaction time is 5 minutes. The reaction temperature is 25° C. The catalyst to reactant ratio can also vary from 0.01 to 0.1. There is no byproduct (soap) is formed. Catalyst can be removed if desired or it can become part of the fuel and contributes considerably for emissions reduction.

TABLE 1

Catalyst Characteristics: Particle size, BEST surface area and percent dispersion of the S-doped TiO2 nano particles used in the instant invention.

| Catalyst Code | Particle size (nm) | Surface area, m$^2$g$^{-1}$ | % Dispersion (CO-chemisorption) |
|---|---|---|---|
| SD(1.3% S/TiO$_2$) | 10 | 182 | 83 |
| C(2% S/TiO$_2$) | 10.5 | 161 | 67 |

TABLE 1-continued

Catalyst Characteristics: Particle size, BEST surface area and percent dispersion of the S-doped TiO2 nano particles used in the instant invention.

| Catalyst Code | Particle size (nm) | Surface area, $m^2g^{-1}$ | % Dispersion (CO-chemisorption) |
|---|---|---|---|
| C-1(2.5% S/TiO$_2$) | 10.8 | 155 | 60 |
| C-2(3% S/TiO$_2$) | 11.6 | 145 | 59 |
| C-3(3.5% S/TiO$_2$) | 11.8 | 140 | 66 |

Components Used to Prepare the Biodiesels

1. Triglycerides. Any source of triglycerides can be used to prepare the fatty acids esters derivatives that provide fuel composition with desired properties. Preferred sources of triglycerides for use in practicing the instant invention include, but not limited to, vegetable oils and fats, non vegetable oils, animal fats and oils. Examples of suitable vegetable oils include, but not limited to, crude or refined soybean, corn, coconut, palm, rapeseed, cotton and oils, Jatropha. Examples of suitable animal fats include, but not limited to, tallow, lard, butter, bacon grease, and yellow grease. Naturally occurring fats and oils are the preferred source of triglycerides because of their abundance and renew ability. Oils with high boiling point are preferred over oils with a lower boiling point.

2. Alcohols: Any alcohol can be used to prepare fatty acids alkyl esters that provide a fuel additive composition with the desired properties. Suitable alcohols for use in the instant invention include, but not limited to, saturated straight, branched, or cyclic alcohols of $C_1$ to $C_6$ and specially include methanol, ethanol, propanol, isopropanol, butanol, isobutanol, t-butanol, pentanol, cyclopentanol, isopentanol, neopentanol, hexanol, isohexanol, cyclohexanol, 3-methylpentanol, 2,2-dimethylbutanol, and 2,3-dimethylbutanol. The preferred alcohol is ethanol. Ethanol is generally available commercially in a denatured form. It is preferred that any alcohol used in the instant invention contains less than five percent water, preferably less then approximately one percent water, to avid saponification or hydrolysis of triglycerides.

3. Olefins: Olefins suitable for the esterification include C1-10 straight, branched, or cyclic olefins. It is preferred that these olefins contain only hydrogen and carbon. Suitable olefins for use in the instant invention include, but not limited to, ethylene, propylene, butylenes, isobutylene, pentene, cyclopentene, isopentene, hexane, cyclohexene, 3-methylpentene, 2,2-dimethylbutene, 2-3,-dimethylbutene. Ethylene, propylene and isobutylene are preferred olefins due to their reactivity and low cost. Highly substituted olefins are preferred because they can stabilize a carbocation intermediate more readily than unsubstituted olefins.

4. Catalysts: Nano particles of the size of 10-12 nm of anatase form of TiO2 or any other catalyst that can provide the properties of photocatalyst. The examples includes but not limited to S, Cu, Mo, Zn, Bi, doped $TiO_2$ nano particles which can provide excess amount of energy for reaction to finish in minimum possible time and at atmospheric pressure and work at room temperature. Strong acid catalysts are preferred. The most preferred acid catalyst is S-doped $TiO_2$ because it becomes the part of fuel and control the emissions.

Example 1

Preparation of S-Doped TiO2 Anatase Form Photocatalyst

Sulfur-doped titanium dioxide was synthesized by precipitation method from $TiCl_4$. 15 ml of $TiCl_4$ were added into 100 ml of 15% $H_2SO_4$ solution in the beaker. A light yellow colored solution was obtained with pH of −0.75. The solution was stirred for two hours at room temperature. The NaOH solution was added drop-wise (the flow of NaOH solution was controlled through HPLC pump) in the resulting solution with continuous monitoring of pH. When the pH reaches to −0.11, the light yellow coloration disappeared and transparent solution was formed. The drop-wise addition of NaOH was continued until the pH of the resulting solution becomes 0.85. At this pH, white precipitate was obtained. The pH of the white precipitate was further increased to 4 by the addition of NaOH. At this pH the reaction was stopped. It was then washed with distilled water. Dried overnight at 110° C. The powder thus obtained was grinded by pestle in a mortar and calcined at 500° C. for 6-hours.

Example 2

Example 2 was prepared using the procedure of Example 1 with S-doping from 1.3 to 2.0%

Example 3

Example 3 was prepared using the procedure of Example 1 with S-doping from 1.3 to 2.25%

Example 4

Example 4 was prepared using the procedure of Example 1 with S-doping from 1.3 to 2.5%

Example 5

Example 5 was prepared using the procedure of Example 1 with S-doping from 1.3 to 3.0%

Example 6

Example 6 was prepared using the procedure of Example 1 with S-doping from 1.3 to 3.5%

Example 7 (Comparative)

Example 6 was prepared using the procedure of Example 1 in which sulfur was completely removed and in this case particle size was around 100-200 μm.

Example 8 (Comparative)

In this example the described esterification procedure was used using ethyl alcohol and sodium hydroxide as basic catalyst. In this case 10 g of neutralized Jatropha oil, 5 g of ethyl alcohol at 95% by weight of alcohol, and 0.15 g of NaOH was dissolved in hydrated alcohol are mixed. The transesterification reaction was carried out while the mixture was stirred at 30° C. After several minutes, the cloudy solution becomes homogeneous. After 2-hours, sampling of the solution was initiated, and it is determined by gas chromatography that the ester has a purity of 80%, with the remainder consisting of mono, di- and triglycerides and sterol esters. The absence of strong alkalis in the medium is verified before initiating a second stage, in which 30 g of glycerin that contains 5% by weight of alcohol and 5% by weight of water is added. The mixture of glycerin, ester and alcohol is evaporated at atmospheric pressure in a distillation column; the alcohol that emerges is dried. The two phases that are formed are cooled to 75° C. and decanting is carried out. Still there was left glycerin phase (lower phase) and ester phase (upper phase) with dissolved alcohol are obtained. In the third stage, the ester phase is washed and dried. It exhibits a purity of 97%.

Evaluation of Catalyst Activity for Bio-Fuel Production 100 ml of oil of Jatropha was mixed with 5 ml of ethyl alcohol and 0.01% by wt of oil S-doped TiO2 nano particles in a glass beaker and stirred at room temperature for 5 minutes. After five minutes the sample was taken and tested using GC/MS and FTIR. Standard Shell Oil Bio-diesel FTIR spectrum and GC/MS was used as standard. The catalyst conversion of 98% was achieved with 1-2% soap formation. The produced biofuel was tested in an engine; no SOxs and NOxs were detected in the engine exhaust. Different S-doped $TiO_2$ nano particles were tested. The best conversion was achieved with 1.3% of S-doping. Table 2 presents the test results of biodiesel produced from Jatropha oil. The fuel was prepared and tested for emission according to EPA 1991 certification. Hot start transient emissions were measured using standard EPA transient test cycle. The NOxs and SOxs emissions were not detected. This table shows that all the results are in the standard range of biodiesels.

TABLE 2

| Test Method | Test Title | Sample No. AB-09 | Sample No. AB-10 | Sample No. AB-11 | Sample No. AB-12 | Conventional | Biodiesel (B100) Limits |
|---|---|---|---|---|---|---|---|
| | | | | Testing of Biofuel | | | |
| Oil to methanol ratio | | 1:1.5 | 1:0.75 | 1:0.5 | 1:0.25 | 1:6 | |
| Reaction Temperature | | Ambient | Ambient | 70° C. | 40° C. | 70° C. | |
| ASTM D-93 | Flash point(PMCC) ° C. | 120 | 130 | 120 | 120 | 177 | Min (130), Max (170) |
| ASTM D-2500 | Cloud Point, ° C. | 9 | 16 | 8 | 11 | 8 | Report |
| ASTM D-96 | B.S & W, % | Nil | Nil | Nil | Nil | Nil | Max 0.05 |
| ASTM D-445 | Kin Viscosity @40° C., cSt | 5.08 | 4.59 | 4.61 | 4.52 | 4.91 | 1.9–6.0 |
| ASTM D-189 | Conradson Carbon Residues % | 0.084 | 0.021 | 0.018 | 0.11 | 0.087 | Max. 0.050 |
| ASTM D-130 | Copper Corrosion @212° F. | 1 | 1 | 1 | 1 | 1 | Max No. 03 |
| ASTM D-874 | Sulfated Ash wt % | 0.05 | 0.066 | Nil | 0.02 | 0.02 | 0.02 |

REFERENCES

1. Klabunde, K. J. *Nanoscale Materials in Chemistry*, Wiley, New York, 2001.
2. Marzan, L. M.; Kamat, P. V., *Nanoscale Materials*, Kluwer Academic Publishers, Boston, 2003.
3. Santacesaria, E.; Tonello, M. *J. Colloid Interface Sci.* 1986, 111, 44.
4. Kera, Y.; Kominami, H., *Photocatalysis: Science and Technology*, M. Kaneko and I. Okura (Eds.), New York: Springer, 2002.
5. Chin, P.; Ding, P. *J. Alloys Compd.* 2005, 390, 255.
6. Tavakoli, A.; Sohrabi, M. *Chem. Rev.* 2007, 61, 151.
7. Dumitrache, F.; Morjan, I. *Appl. Surf. Sci.* 2005, 247, 25.
8. Burda, C.; Chen, X. *Chem. Rev.* 2005, 105, 1025.
9. Apek, I. *Adv. Colloid Interface Sci,* 2004, 110, 49.
10. Schwarz, J. A. *Chem. Rev.* 1995. 95, 447.
11. Suchanek, W. L.; Riman, E. R. *Adv. Sci. Tech.* 2006, 45, 184.
12. Osman F, Fats, Soap and Coating Media, 1968, 3, 331.

What is claimed is:

1. A process for producing biofuels, the process comprising:
   a. Providing at least one organic source selected from the group consisting of vegetable oils, animal oils, fats, non-vegetable oils, and mixtures of glycerides;
   b. Providing an organic alcohol;
   c. Providing a nano-catalyst consisting of a doped titanium dioxide;
   d. Reacting the above mixture at room temperature and at normal atmospheric pressure to produce alkyl esters as biofuels.

2. The process of claim 1 wherein said organic source is an acidic oil.

3. The process of claim 1 wherein said organic alcohol has 1-5 carbons.

4. The process of claim 1 wherein said organic alcohol comprises 1-5% by weight of mixture.

5. The process of claim 1 wherein said organic alcohol is ethanol.

6. The process of claim 1 wherein said nano-catalyst comprises 0.01 to 1% of the total mixture.

7. The process of claim 1 wherein said nano-catalyst is doped between 1 to 5% by weight.

8. The process of claim 1 wherein said nano-catalyst has a band gap between 3.2 ev to 2.2 ev.

9. The process of claim 1 wherein said nano-catalyst is doped with sulfur.

10. The process of claim 1 wherein said nano-catalyst is in anatase phase.

11. The process of claim 1 wherein said nano-catalyst is in rutile phase.

12. The process of claim 1 wherein said nano-catalyst is doped with a metal or metalloid.

13. The process of claim 1 wherein said nano-catalyst is doped with nitrogen or oxygen.

14. The process of claim 1 wherein said nano-catalyst is doped with an anionic material.

15. The process of claim 1 wherein said nano-catalyst has particle size between 2-20 nm.

16. The process of claim 1 wherein said nano-catalyst comprises surface area of 140 m2 g-1 to 160 m2 g-1.

17. The process of claim 1 wherein said nano-catalyst has a pore volume between 1 and 3.5 mL/g.

18. The process of claim 1 wherein said nano-catalyst is dispersed on a support surface comprising of silica, alumina, zeolite or any combination thereof.

19. The process of claim 1 wherein said nano-catalyst is used in a powder form.

20. The process of claim 1 wherein said nano-catalyst is used in a slurry form.

21. The process of claim 1 wherein the purity of said biofuels produced is greater than 95%.

22. The process of claim 1 wherein the cloud point of said biofuels is less than 32 C.

23. The process of claim 1 wherein the cetane number of said biofuels is 60.

24. The process of claim 1 wherein said reaction is carried out for 2 to 10 minutes.

25. The process of claim 1 wherein said biofuels contains no sulfur or nitrogen compounds.

\* \* \* \* \*